(12) United States Patent
Wong (10) Patent No.: US 9,902,375 B2
(45) Date of Patent: Feb. 27, 2018

(54) DEVICE USED FOR PRESSING AIR AND/OR TIRE SEALANT INTO A TIRE AND A COMPRESSION PART

(71) Applicant: Wai Kan Wong, Hong Kong (HK)

(72) Inventor: Wai Kan Wong, Hong Kong (HK)

(*) Notice: Subject to any disclaimer, the term of this patent is extended or adjusted under 35 U.S.C. 154(b) by 171 days.

(21) Appl. No.: 14/594,350

(22) Filed: Jan. 12, 2015

(65) Prior Publication Data
US 2015/0197066 A1 Jul. 16, 2015

(30) Foreign Application Priority Data

Jan. 13, 2014 (CN) .................... 2014 2 0018652 U
Jul. 18, 2014 (CN) ........................ 2014 1 0344664
Jul. 18, 2014 (CN) .................... 2014 2 0401617 U (51) Int. Cl.
*B60S 5/04* (2006.01)
*B29C 73/16* (2006.01)
*B29L 30/00* (2006.01)

(52) U.S. Cl.
CPC .............. *B60S 5/04* (2013.01); *B29C 73/166* (2013.01); *B29L 2030/00* (2013.01)

(58) Field of Classification Search
CPC ....... B60S 5/04; B29C 73/166; B29C 73/025; B29L 2030/00
USPC ............. 141/38, 2, 18; 137/15.09, 595, 317; 251/149.1, 149.6; 285/317, 192
See application file for complete search history.

(56) References Cited

U.S. PATENT DOCUMENTS

| | | | | |
|---|---|---|---|---|
| 2,823,048 A * | 2/1958 | Hansen | ................. | F16L 37/107 137/614.04 |
| 2,979,080 A * | 4/1961 | Hewitt | ................ | F16K 11/0716 137/625.68 |
| 2,981,322 A * | 4/1961 | Schum | ................. | B63H 21/265 123/195 P |
| 3,465,777 A * | 9/1969 | Thorburn | ................. | F15C 3/06 137/112 |
| 3,477,105 A * | 11/1969 | Cranage | ................. | F16K 27/02 137/360 |
| 4,617,012 A * | 10/1986 | Vaillancourt | ......... | A61M 39/10 285/12 |
| 4,753,268 A * | 6/1988 | Palau | ................. | F16L 37/0841 137/595 |
| 8,020,588 B2 * | 9/2011 | Wang | .................... | B29C 73/166 141/100 |
| D649,240 S * | 11/2011 | Lewis | ......................... | D24/129 |
| 8,720,495 B2 * | 5/2014 | Hong | .................... | B29C 73/166 137/223 |
| 9,316,358 B2 * | 4/2016 | Shih | ..................... | A61H 9/0078 |

(Continued)

FOREIGN PATENT DOCUMENTS

DE 101 06 468 A1 * 8/2002

*Primary Examiner* — Jason K Niesz
*Assistant Examiner* — James Hakomaki
(74) *Attorney, Agent, or Firm* — Brown & Michaels, PC (57) ABSTRACT

A device used for pressing air and/or tire sealant into a tire. The device has a device filled with tire sealant, a compression part, a vent port, a fluid port, a linkage and a socket which can be connected to the vent port or the fluid port by the linkage part, so as to supply compressed air generated by the compression part either to the device filled with tire sealant, so as to pump the tire sealant out of the fluid port and into the tire, or to the vent port, so as to pump air into the tire.

9 Claims, 7 Drawing Sheets

(56) References Cited

U.S. PATENT DOCUMENTS

| | | | |
|---|---|---|---|
| 2009/0050232 A1* | 2/2009 | Guan | B29C 73/166 141/38 |
| 2010/0071791 A1* | 3/2010 | Schiel | F16K 11/0712 137/625.69 |
| 2013/0092286 A1* | 4/2013 | Chou | B29C 73/166 141/38 |
| 2013/0105055 A1* | 5/2013 | Chou | B60S 5/043 152/416 |
| 2013/0269811 A1* | 10/2013 | Hong | B60C 1/0041 137/876 |
| 2014/0209207 A1* | 7/2014 | Spindler | B60S 5/04 141/38 |

* cited by examiner

DEVICE USED FOR PRESSING AIR AND/OR TIRE SEALANT INTO A TIRE AND A COMPRESSION PART

TECHNICAL FIELD

The invention relates to a tire-repairing device, especially a device used for pressing air and/or tire sealant into a tire.

BACKGROUND ART

Although spare tires have been used for decades, in recent years, automobile and other vehicles are usually not equipped with spare tires. Instead, a small compression apparatus and a small cassette carrying with sealing mass are equipped, which named as tire-repairing kit, which is cheaper and lighter than spare tires. Automatic-inflating tire repair fluid is a kind of non-poisonous, nonflammable and non-tire sticky liquid, of which the PH value is neutral and its raw material is composed of a variety of polymer compounds, it is also widely used as emergency equipments. It is fit for tire of various vehicles, and needs no auxiliary tool, tires with several leakage holes with diameters less than 8 mm as well as tires with slow air leakage can be repaired automatically in a short period of time, and automatic-inflating. It is featured by: repaired at the time of puncture, repeated use, safe, sanitary, convenient and swift. In consequence, traffic accidents resulted from tire defect can be avoided, and service life of tires can be prolonged. Since automatic inflatable liquid is small in size, convenient to carry, no need of tool during tire-repairing, and no need of disassembling tire, even female without any specialized knowledge can repair a tire and inflate air within 1 min, enabling the vehicle to be full of vitality once again. Thus, trouble of tire change is solved, and the waiting time and cost for trailer are saved; meanwhile, it has the function of extinguishment with effect pretty close to that of conventional fire extinguishers. With a bottle of such new-tech product featured by quick repair, quick filling, cooling and extinguishment, you will have great convenience in traveling and dealing with affairs. It is obviously beneficial to the environment, i.e. fuel consumption is lowered due to lighter weight, and car boot can be utilized in a better way. It is common at present that a complete device comprising a compressor group (or pump group) and a cassette with sealing mass is equipped in car boot. After the compressor is started, the device can only connect the air valve on one wheel, through which the sealing mass is pumped into the tire. When the cassette becomes empty, compressed air from the compressor will be led directly into the tire automatically. Thus, the tire is dilated to the required tire pressure.

GB2452137A has disclosed a tire-repairing kit, comprising two outlets for air compression, one of which connects to the cassette carrying the sealing mass, and is required to be screwed on the wheel valve before the sealing mass is pumped into the punctured tire, while the other outlet is used as compressed air outlet when carrying out different pumping work. When put into use, an electronic switch only allowing the pump-out of sealing mass is arranged at the outlet connection, used for importing the sealing mass into the tire. In addition, with a second electronic switch, compressed air can be discharged from the second outlet. In the tire repair kit above, tire sealant is pressed into the tire under the control of electronic switch, there is a technical problem that operation fails to be carried out once electric power can't be provided to electronic switch.

Moreover, with relatively single function, the tire repair kit is only used for pressing the tire sealant into the tire. Nevertheless, general tires with air leakage require being re-inflated, while currently there is no device that can complete tire inflating and repairing simultaneously only by mechanical means.

SUMMARY

The present invention is to provide a device used for pressing air and/or tire sealant into a tire, to solve the problem that there is no equipment in the existing technology which can realize tire inflating and repairing only by mechanical ways.

On one hand, the present invention provides a device used for pressing air and/or tire sealant into a tire, of which the technical proposal is as below: the device comprises a main part and a socket part, wherein:

the main part further comprises:

a tire sealant apparatus filled with tire sealant;

a compression part that compresses the air that entered the main part, so as to pump out compressed air or the tire sealant;

a vent port and a fluid port; and a linkage part, at least arranged in either the vent port or the fluid port, or at least connected to either of them, for enabling a first channel or a second channel; wherein the first channel is for the compressed air generated by the compression part entering into tire sealant apparatus and to pump the tire sealant out to the fluid port; while the second channel is for the compressed air generated by the compression part entering into the vent port;

the said socket part further comprises:

an inlet pipe, used for pressing the compressed air or tire sealant into the tire; and a socket component, one end of which connects to the said inlet pipe, while the other end connects to the vent port and/or the fluid port, and to trigger the linkage part to enable either the first channel or the second channel.

As a preferred embodiment, the socket component further comprises:

a first jack: arranged with a connecting device inside, and the connecting device connects with the vent port or the fluid port; and a second jack: connects to the vent port or the fluid port, arranged with an active device inside, so as to trigger the linkage part to enable either the first channel or the second channel, wherein:

when the device is in the state of air inflating mode: the first jack connects with the vent port, and the second jack connects with the fluid port, triggering and enabling the second channel;

when the device is in the state of tire sealant infusion mode: the first jack connects with the fluid port, while the second jack connects with the vent port, triggering and enabling the first channel.

As a preferred embodiment, one end of the socket component connects to the inlet pipe, while the other end connects to the first vent port or the fluid port; the device further comprises:

an activation part;

when the device is used for infusing tire sealant into the tire, the said activation part connects to the first vent port, triggering the linkage part and enabling the first channel;

when the device is used for inflating air to the tire, the socket component connects to the first vent port, enabling the second channel.

As a preferred embodiment, the active device is a jack-prop.

As a preferred embodiment, the linkage part comprises a piston device; wherein the active device makes the piston move, so as to change the flow direction of the compressed air to enable either the first channel or the second channel.

As a preferred embodiment, the piston device comprises a piston and an elastic device. The piston and the elastic device are arranged respectively in the movement of the main part; wherein the elastic device is arranged at the rear end of the piston and connects to the piston.

As a preferred embodiment, a cock body of the piston is at least provided with: a first convex body, a flat body and a second convex body. A flat body space is formed between the flat body and the movement, which is interconnected with the vent part of the compression part, wherein, when the piston is in the state of uncompression, the second convex body fits closely with a shell of the movement to form a seal, and the compressed air of the flat body space enters directly into the vent port, enabling the second channel;

when the piston is in the state of compression, the first convex body fits closely with the shell of the movement to form a seal, and the compressed air of the flat body space enters the tire sealant apparatus, so as to pump the tire sealant out to the fluid port, enabling the first channel.

As a preferred embodiment, the outside of the first convex is provided with a sealing device.

As a preferred embodiment, the outside of the second convex is arranged with a sealing device.

On the other hand, the present invention provides another device used for pressing air and/or tire sealant into a tire, comprising a main part and a socket part, wherein:

the main part further comprises:

a tire sealant apparatus filled with tire sealant;

a compression part that compresses the air that entered into the main part, so as to pump out compressed air or tire sealant;

a vent port and a fluid port; and a linkage part, which is arranged at the vent port, or connects with the vent port, is used for enabling a first channel or a second channel; Wherein the first channel is for the compressed air generated by the compression part entering the tire sealant apparatus, so as to pump the tire sealant out to the fluid port; and the second channel is for the compressed air generated by the compression part entering the vent port;

the socket part further comprises:

an inlet pipe used for pressing the compressed air into the tire;

a socket component;

an activation part;

and a throat pipe of tire sealant.

when the device is used for infusing tire sealant to a tire, the activation part connects to the vent port, triggering the linkage part and enabling the first channel; and the compression part presses the air into the tire sealant apparatus, so as to pump out the tire sealant; and the throat pipe of tire sealant connects to the outlet of the tire sealant apparatus, which is used for pressing the pumped tire sealant into the tire;

when the device is used for inflating air into the tire, one end of the socket component connects to the inlet pipe, while the other end connects to the vent port, and the compression part presses the air via the vent port and through the inlet pipe into the tire.

As a preferred embodiment, the active device is a jack-prop.

As a preferred embodiment, the linkage part comprises a piston device; when the active device connects to the first vent port, the active device make the piston move and enables the first channel.

As a preferred embodiment, the piston device comprises a piston and an elastic device, wherein the piston and the elastic device are provided respectively in a movement of the main part, and the elastic device is arranged at the rear end of the piston and connects with the piston.

As a preferred embodiment, a cock body of the piston is at least provided with: a first convex body, a flat body and a second convex body. Wherein a flat body space is formed between the flat body and the movement, which is interconnected with the vent part of the compression part, when the piston is in the state of uncompression, the second convex body fits closely with a shell of the movement to form a seal, and compressed air of the flat body space enters directly into the first vent port, enabling the second channel;

when the piston is in the state of compression, the first convex body fits closely with the shell of the movement to form a seal, enabling the first channel, and compressed air of the flat body space enters the tire sealant apparatus via a second vent port, so as to pump the tire sealant out to the fluid port.

According to another respect of the present invention, the invention provides a compression part. The compression part is used for the above-mentioned device, comprising a first vent port and a second vent port; and the device also comprises an linkage apparatus;

when the device infuses tire sealant to the tire, the second vent port connects to the inlet of the tire sealant apparatus, and the linkage part is compressed, and enables the first channel, wherein compressed air is pressed into the tire sealant apparatus via the second vent port, and tire sealant is pumped out.

when the device inflates air to the tire, compressed air is pressed into the tire via the first vent port.

Compared with the existing technologies, the invention has the following advantages:

First of all, the present invention provides a device which can not only inflate air but can also infuse tire sealant into a tire. For users, it is very convenient because two functions can be realized with bringing only one device. Moreover, the invention is simple in structure and easy to produce and convenient to carry.

Second, use occasion of the present invention is greatly promoted because the above function can be realized only with a simple mechanical structure, needless of extra electric switch.

DETAILED DESCRIPTION OF EMBODIMENTS

The following specific instructions of the present invention will be given by combining with the figures. In order to make technicians of the field understand the contents of the invention clearly and completely and can carry out the technical of the invention, great amount of details are disclosed in the embodiments. However, it is evident that without these details, technicians of the field can also implement technical proposals of the present invention, achieve the purpose and realize the effect of the present invention. These details are the optimum mode of execution selected by the inventors based on a great deal of experiments, and they are not intended to restrict the protection scope of the present invention. Protection scope of the present invention is subject to the contents of the claims. Besides, technical proposals obtained by technicians of the field without creative work based on the contents disclosed by this application document are also protected by the present invention.

Embodiment 1

Figure 1:
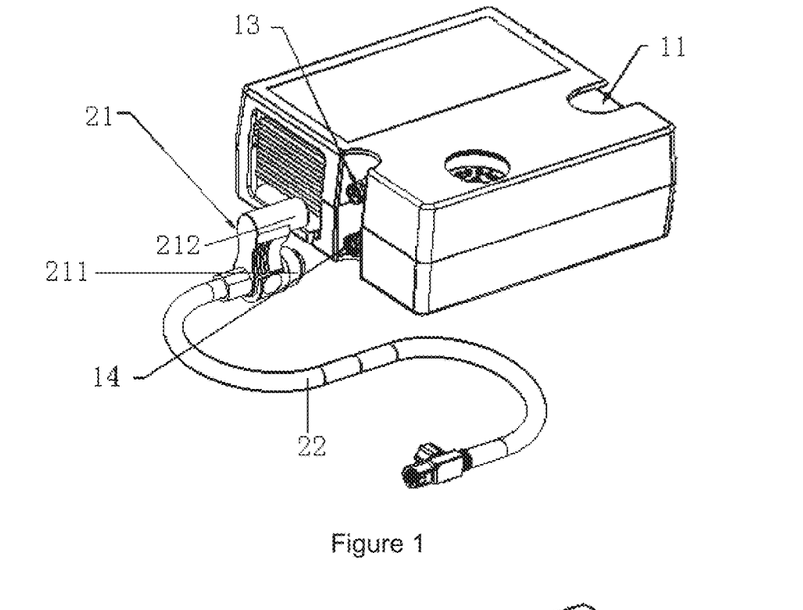
FIG. 1 shows a first perspective view of the device of the present invention used for pressing air and/or tire sealant into a tire.
Figure 2:
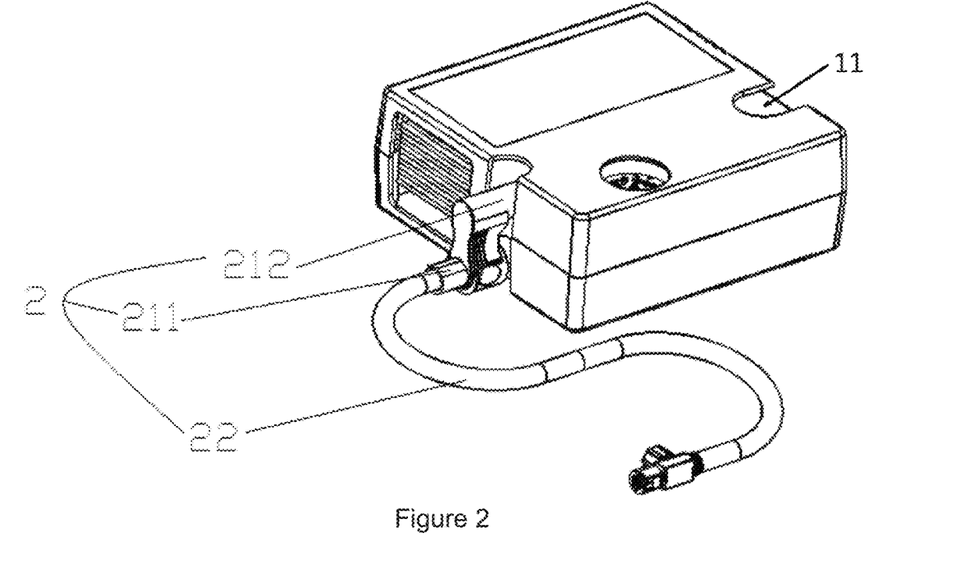
FIG. 2 shows a perspective view of the device of FIG. 1 with using state 1.
Figure 3:
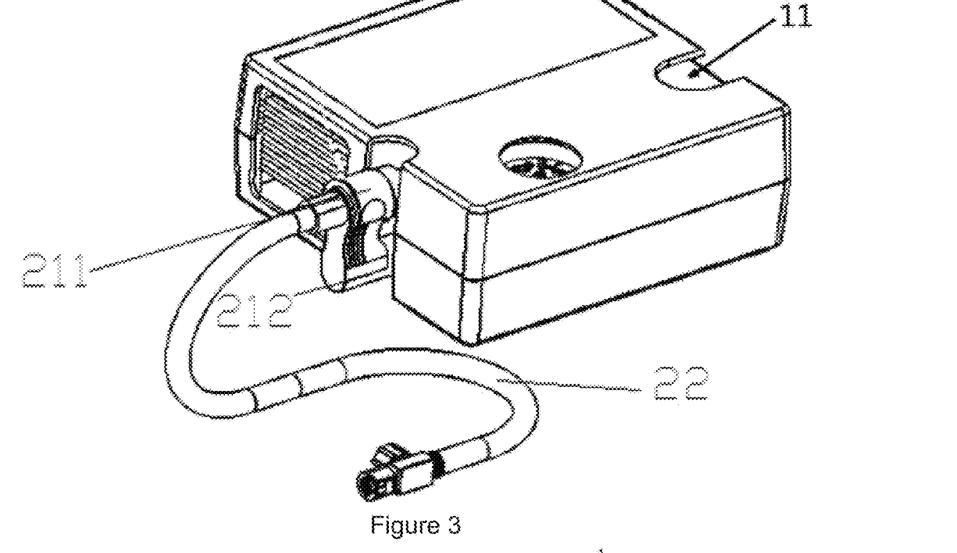
FIG. 3 shows a perspective view of the device of FIG. 1 with using state 2.

Please refer to FIG. 1 to FIG. 3 as well as FIG. 10 to FIG. 13, a device used for pressing air and/or tire sealant into a tire, comprising a main part 1 and a socket part 2, wherein:
the main part 1 further comprising:
a tire sealant apparatus 11 filled with tire sealant;
a compression part that compresses the air that entered the main part, so as to pump out compressed air or tire sealant;
a vent port 13 and a fluid port 14; and
a linkage part, at least arranged in either the vent port 13 or the fluid port 14, or at least connected to either of them, for enabling a first channel or a second channel, wherein the first channel is for the compressed air generated by the compression part entering the tire sealant apparatus 11, so as to pump the tire sealant out to the fluid port 14; and the second channel is for the compressed air generated by the compression part entering the vent port 13.

The main part 1 can be a shell, and the compression part and the tire sealant apparatus 11 are arranged respectively in the shell, wherein the vent port 13 and the fluid port 14 can be staggered up and down and located at the side face of the shell. The compression part and the tire sealant apparatus 11 can be located respectively at the left and right portions of the vent port 13 and the fluid port 14. In the embodiment, to be aesthetic and convenient, the side face of the shell is a small arc-shape and the vent port 13 and the fluid port 14 are located respectively in the small arc-shaped shell, meanwhile the ends of the vent port 13 and fluid port 14 are provided flush with other side portions of the shell. In addition, the tire sealant apparatus 11 can be provided as changed conveniently.

The socket part 2 further comprises:
An inlet pipe 22 used for pressing the compressed air or tire sealant into a tire; and
a socket component 21, one end of which connects to the said inlet pipe 22, while the other end connects to the vent port 13 and/or the fluid port 14, and to trigger the linkage part to enable either the first channel or the second channel.

Moreover, the socket part 21 further comprises:
A first jack 211: arranged with a connecting device 214 inside, and the connecting device 214 connects with the vent port 13 or the fluid port 14; and
a second jack 212: connects to the vent port 13 or the fluid port 14, and is provided with an active device inside, so as to trigger the linkage part to enable either the first channel or the second channel, wherein:
when the device is in the state of air inflating mode: the first jack 211 connects with the vent port 13, while the second jack 212 connects to the fluid port 14, triggering and enabling the second channel (shown in FIG. 3);
when the device is in the state of tire sealant infusion mode: the first jack 211 connects with the fluid port 14, while the second jack 212 connects to the vent port 13, triggering and enabling the first channel (shown in FIG. 2).

Via the above apparatus, the device can realize either tire inflating or tire repairing.

The socket component 21 can be a socket of dual purpose, and the activation device can be a jack-prop 213 which is received by part 123.

The linkage part comprises a piston device; wherein the activation device makes the piston move, so as to change flow direction of the compressed air and enable either the first channel or the second channel.

Figure 10:
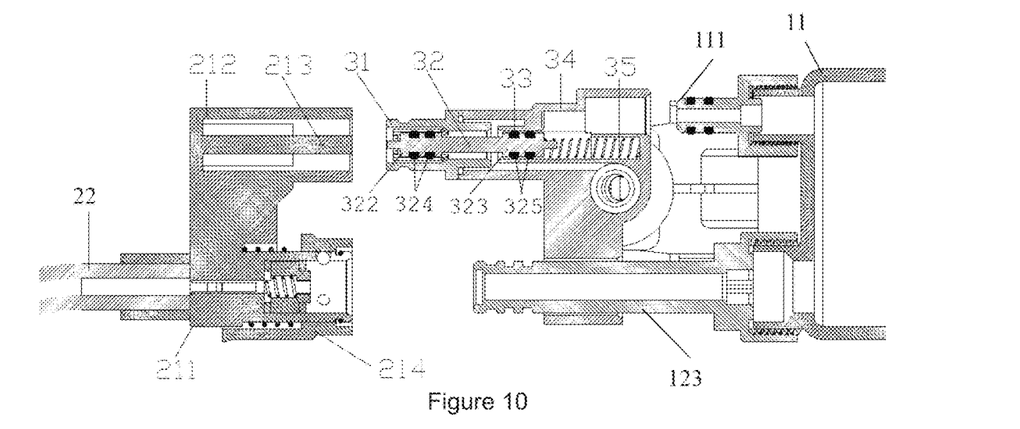
FIG. 10 shows a first sectional view of the device of the present invention.
Figure 11:
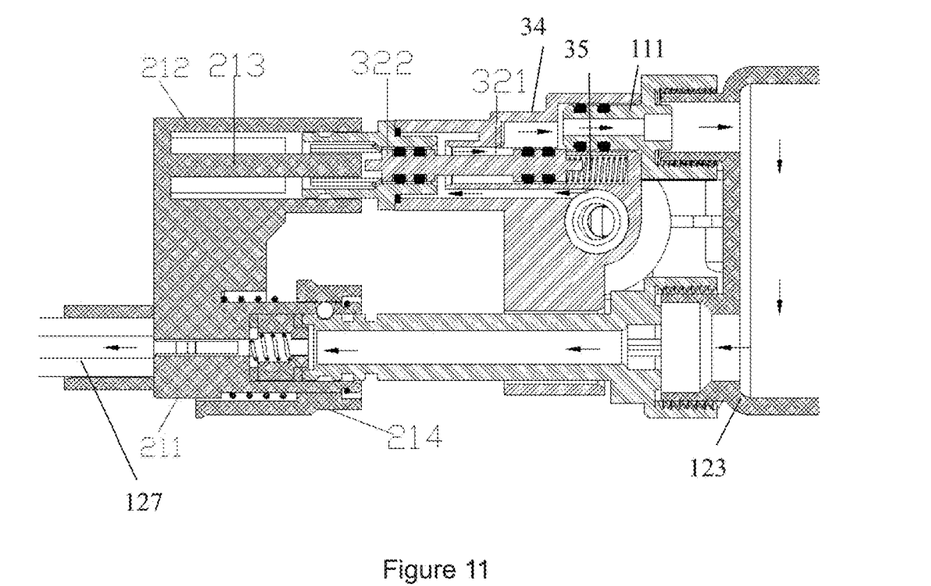
FIG. 11 shows a gas flow diagram of using state 1 of the device used for pressing air and/or tire sealant into a tire of the present invention.
Figure 12:
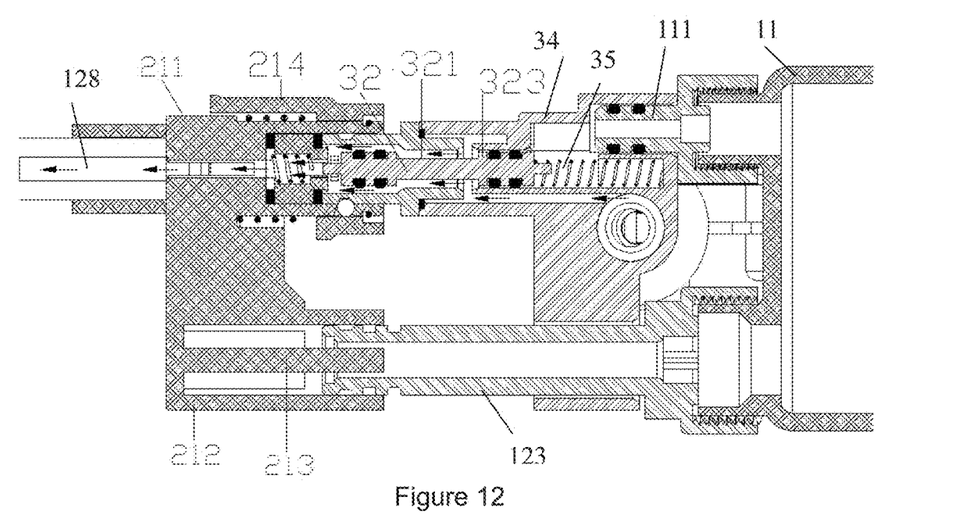
FIG. 12 shows a gas flow diagram of using state 2 of the device used for pressing air and/or tire sealant into a tire of the present invention.
Figure 13:
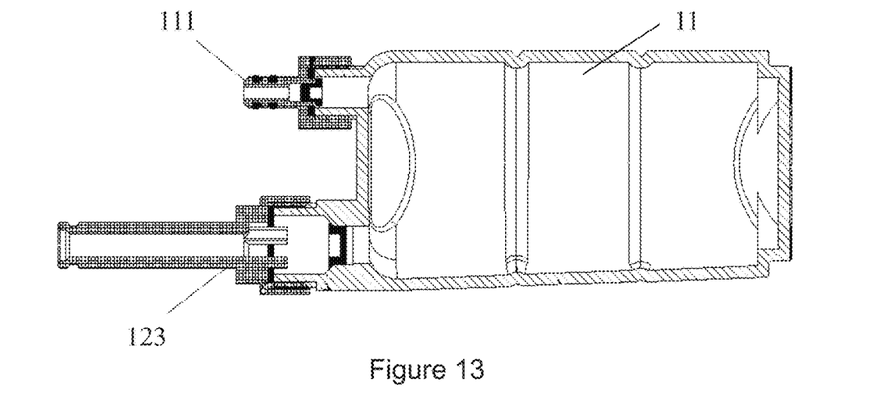
FIG. 13 shows a second sectional view of the device of the present invention.

Further refer to FIG. 10, the piston device comprises a piston 32 and an elastic device 35. Wherein the piston 32 and elastic device 35 are arranged respectively in a movement 34 of the main part, and the elastic device 35 is arranged at the rear end of the piston 32 and connects with the piston 32.

A cock body of the piston is at least provided with: a first convex body 322, a flat body 321 and a second convex body 323. Wherein a flat body space is formed between the flat body 321 and the movement 34, which is interconnected with the vent part of the compression part,
when the piston is in the state of uncompression, the second convex body 323 fits closely with a shell of the movement to form a seal, and the compressed air of the flat body space enters directly into the vent port, enabling the second channel (please refer to FIG. 12, and the channel directed by the arrow is the second channel);
when the piston is in the state of compression, the first convex body 321 fits closely with the shell of the movement to form a seal, and the compressed air of the flat body space enters the tire sealant apparatus, so as to pump the tire sealant out to the fluid port, enabling the first channel (please refer to FIG. 11, and the channel directed by the arrow is the first channel).

Outside of the first convex body 322 is provided with a sealing device (such as O-rings 324). Outside of the second convex body 323 is arranged with a sealing device (such as O-rings 325).

Namely, a device for pressing air and/or tire sealant into a tire, comprising a dual-purpose plug, a piston 32, a movement 34 and a tire sealant apparatus 11 (such as a sealant bottle). The device changes the flow direction of compressed air by virtue of the movement of the piston position and the device has two operating modes:

1) tire sealant infusion mode (FIG. 11): fix the plug on the venting cap of the sealant bottle via a dual-purpose plug connection device 214 which connects to part 123 of tire sealant apparatus 111, the jack-prop of the dual-purpose plug presses the piston deeply into the movement, and the O-shaped ring on the left of the piston seals the clearance between the piston and the coupling head, the compressed air then enters the sealant bottle via the clearance between the piston and the movement (the first channel or partial of the first channel), and forces the tire sealant to flow out via the dual-purpose socket and the inlet pipe 22; the direction of arrow is the flow direction of the compressed air and the tire sealant.

2) air inflating mode (FIG. 12): fix the plug on the coupling head 31 via the dual-purpose plug connection device 214. Because of the action of the elastic device (such as a spring) of the piston, piston 32 is pushed by the piston spring 35 to the front end of the coupling head 31, and the O-shaped ring 33 on the right side of the piston seals the clearance between the piston 32 and the movement 34, while compressed air flows via the clearance between the piston 32 and the coupling head 31 (namely the second channel), and flows out via the dual-purpose plug and the inlet pipe 22, wherein the direction of arrow is the flow direction of compressed air.

Embodiment 2

Figure 4:
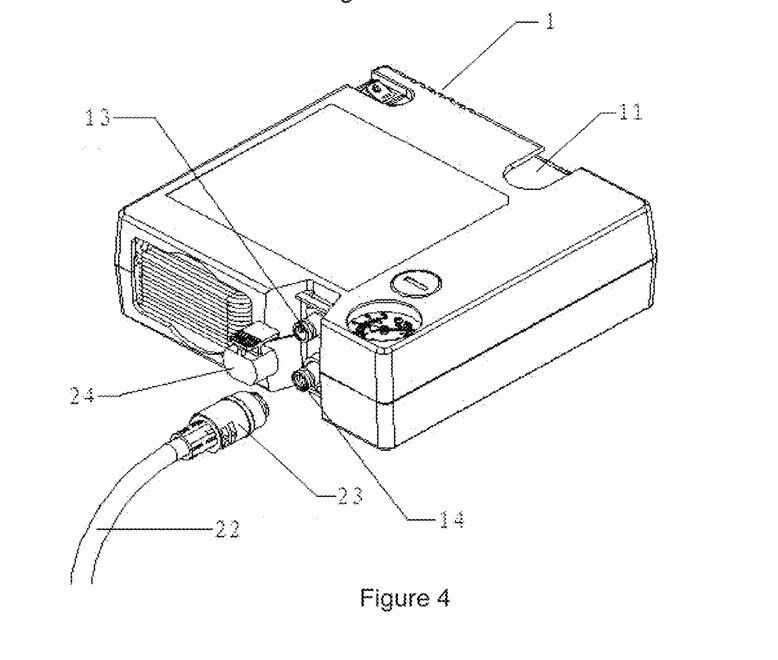
FIG. 4 shows a second perspective view of the device of the present invention used for pressing air and/or tire sealant into a tire.
Figure 5:
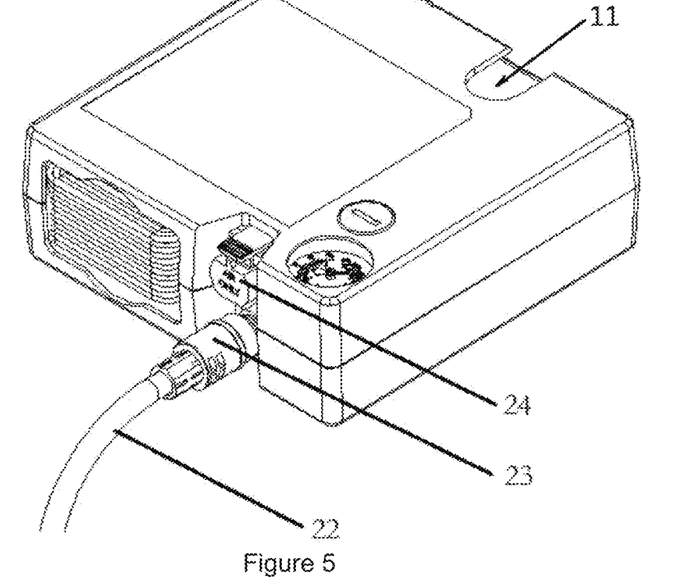
FIG. 5 shows a perspective view of the device of FIG. 4 with using state 1.
Figure 6:
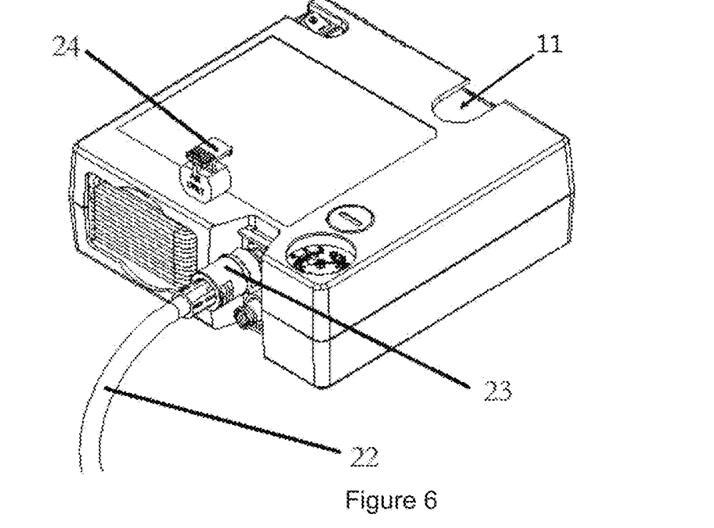
FIG. 6 shows a perspective view of the device of FIG. 4 with using state 2.

As shown in FIG. 4, FIG. 5 and FIG. 6, a device used for pressing air and/or tire sealant into a tire, comprises a main part 1 and a socket part 2, wherein:

the main part 1 further comprises:

a tire sealant apparatus 11 filled with tire sealant;

a compression part that compresses the air that entered the main part, so as to pump out compressed air or tire sealant;

a vent port 13 and a fluid port 14; and a linkage part, at least arranged in either the vent port 13 or the fluid port 14, or at least connects to either of them, for enabling a first channel or a second channel. Wherein the first channel is for the compressed air generated by the compression part entering into the tire sealant apparatus 11, so as to pump the tire sealant out to the fluid port 14; and the second channel is for the compressed air generated by the compression part entering into the vent port 13.

The socket part 2 further comprises:

an inlet pipe 22 used for pressing the compressed air or tire sealant into the tire;

a socket component 23, one end of which connects the inlet end of the inlet pipe 22, while the other end connects the vent port 13 or the fluid port 14; and an activation part 24, when the device is used for infusing fluid (tire sealant) to a tire, the activation part 24 connects to the vent port 13, triggering the linkage part to enable the first channel; and the compression part presses the compressed air into the tire sealant apparatus 11, and pumps out the tire sealant; and the inlet pipe 22 connects to the fluid port 14, the tire sealant pumped out there through enters in the tire via the inlet pipe 22.

On the other hand, when the tire sealant in the tire sealant apparatus 11 is pumped exhaustedly, compressed air is pressed into the tire sealant apparatus 11 and then pumped out via the fluid port 14 to enter the tire via the inlet pipe 22. In the existing technologies, operation of tire sealant infusion and air inflating are relatively tedious and time-consuming, because after fluid infusion, the device for fluid infusion as well as its parts have to be removed and the air inflating device and its parts are to be installed. Nevertheless, the device provided by the present invention can directly finish air inflating after fluid infusion without mode conversion, which is simple and convenient for users.

If the tire requires air inflating only, one end of the socket component 23 connects to the vent port 13, while the other end connects to the inlet pipe 22, then the socket component 23 triggers the linkage part to enable the first channel, and compressed air is pressed out by the compression part to enter directly into the vent port and then enters the tire via the inlet pipe 22.

This operation mode is appropriate for tire inflating only. As previously mentioned, if a tire is required to be not only infused with tire sealant but also inflated with air, and the tire sealant apparatus 11 could be empty after fluid (tire sealant) infusion, then fluid infusion mode should be selected, so as to realize fluid infusion first and then air inflating.

Main distinction between this embodiment and embodiment 1 is that the socket component in embodiment 1 is separated and improved in this embodiment, wherein one of its jacks is removed and an activation part 25 is isolated from it. In this embodiment, the device is provided with a separate activation part 24, which is mainly for the convenience of being memorized by users and reducing the possibility of misoperation. On one hand, there is only one circumstance that the activation part 24 connects with the vent port 13, no connecting with the fluid port; on the other, the activation part 24 is only required to be connected to the vent port 13 under fluid infusion state. Obviously, it is easier for consumers to understand and know well about the device provided by this embodiment, because it has solved the weakness that it is difficult to distinguish the two jacks in Embodiment 1.

As shown in FIG. 5 and FIG. 6, in this embodiment, the socket component 23 comprises only one jack and the activation part 24 is implemented independently instead of arranging in the jack of the socket component 23.

FIG. 5 is the connection diagram when the device pumps tire sealant into a tire; FIG. 6 is the connection diagram when the device inflates air into a tire.

As shown in FIG. 5, the activation part 24 is inserted into the vent port 13, and triggers a linkage apparatus to enable the first channel of the device; the compression part boosts pressure and presses air into the tire sealant apparatus 11 via the inlet of the apparatus; driven by air pressure, the tire sealant pumps out from the fluid port 14, and enters the tire via the inlet pipe 22, so as to infuse fluid into the tire.

As shown in FIG. 6, the socket component 23 is inserted into the vent port 13, and triggers the linkage apparatus to enable the second channel of the device; the compression part boosts pressure to make air pass through the second channel, and the air is pressed into the tire via the vent port 13 and the inlet pipe 22 in sequence, so as to realize tire inflation.

Specifically, the activation part 24 can be a jack-prop; the linkage part comprises a piston device; the jack-prop makes the piston move, so as to change flow direction of the compressed air to enable either the first channel or the second channel.

Figure 9:
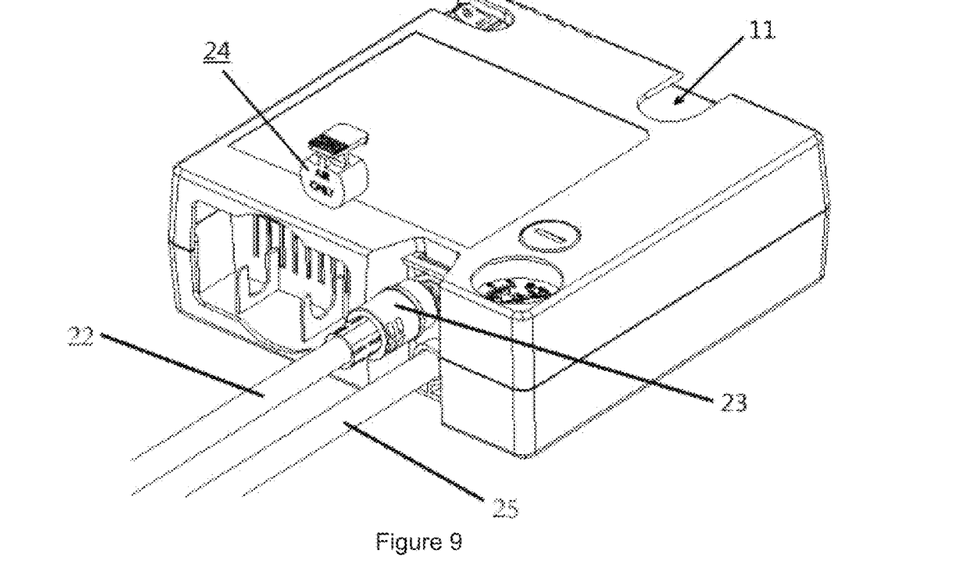
FIG. 9 shows a perspective view of the device of FIG. 7 with using state 2.

As shown in FIG. 9, under the state of fluid infusion, to enable the inlet of the tire sealant apparatus to have better air tightness, and avoid air leakage, the inlet of the tire sealant apparatus is provided with a sealing device (such as an O-shaped ring) and a first sealing element; the outlet of the tire sealant apparatus is provided with a sealing gasket and a second sealing element.

Embodiment 3

Figure 7:
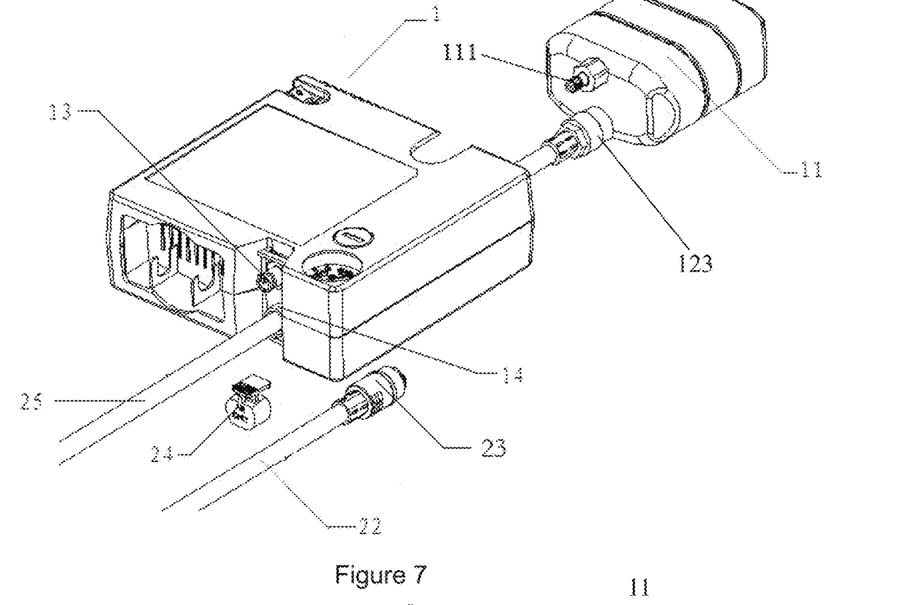
FIG. 7 shows a third perspective view for the device of the present invention used for pressing air and/or tire sealant into a tire.
Figure 8:
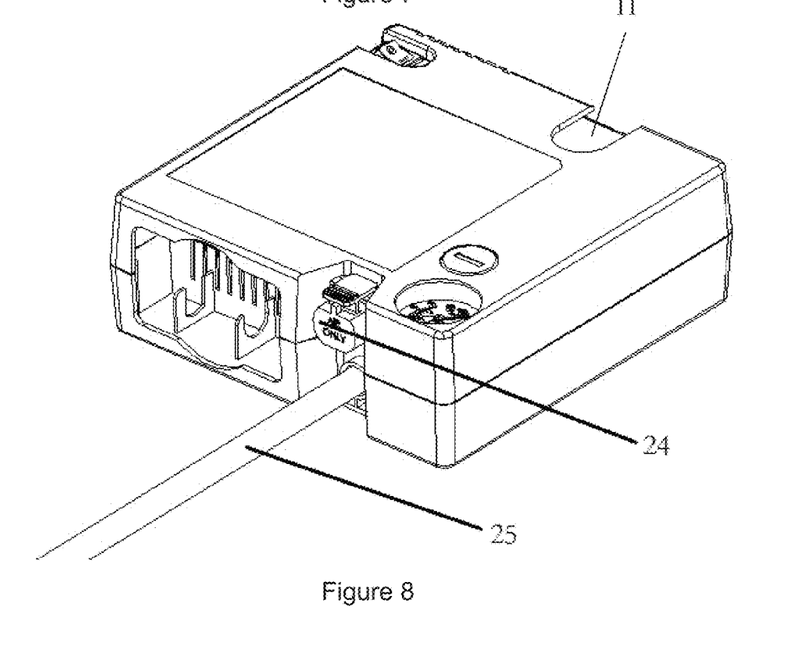
FIG. 8 shows a perspective view of the device of FIG. 7 with using state 1.

Combining FIG. 7, FIG. 8 and FIG. 9, a device used for pressing air and/or tire sealant into a tire, comprises a main part 1 and a socket part 2, wherein:

the main part further comprises:
a tire sealant apparatus 11 filled with tire sealant;
a compression part that compresses the air entering the main part, so as to pump out compressed air or tire sealant;
a vent port 13 and a fluid port 14; and
a linkage part, which is provided at the vent port, or connects with the vent port 13, which is used for enabling a first channel 127 or a second channel 128. Wherein the first channel 127 is for the compressed air generated by the compression part entering the tire sealant apparatus 11, so as to pump the tire sealant out to the said fluid port 14; and the second channel 128 is for the compressed air generated by the compression part enters the vent port 14.

The socket part 2 further comprises:
an inlet pipe 22, used for pressing the compressed air or tire sealant into the tire;
a throat pipe 25 of the tire sealant;
a socket component 23; and
an activation part 24;
when the device is used for infusing fluid into a tire, the activation part 24 connects to the vent port 13, triggering the linkage part and enabling the first channel 127; the compression part presses air into the tire sealant apparatus 11 to pump out the tire sealant; the throat pipe 25 of the tire sealant connects to the fluid port 14, which is used for importing the tire sealant pumped out into the tire; certainly, the throat pipe 25 of the tire sealant can also be directly connected to the outlet 111 of the tire sealant apparatus 11 and be fixed on it, thus the tire sealant can also be imported into the tire. This is not restricted in the invention.

When the device is used for inflating air into a tire, one end of the socket component 23 connects to the inlet pipe, while the other end connects the vent port 13, and to enable the second channel; the compression part 12 presses the air into the tire via the vent port 13 and through the inlet pipe 22.

Compared with other embodiments above, a throat pipe 25 of tire sealant is increased to the device of this embodiment. Main purpose of adding the throat pipe 25 is to enable the inlet pipe 22 to serve exclusively as air inflating channel, while the throat pipe 25 to serve exclusively as fluid infusion channel. To be installed more conveniently, one end of the throat pipe 25 is connected to the fluid port 14 and secured, or connected to the outlet of the tire sealant apparatus 11 and secured. Unless the tire sealant apparatus 11 should be changed, throat pipe 25 will not be separated from the fluid port/outlet of the tire sealant apparatus 11. Thus, the issue of insecure contact of the throat pipe 25 during reinstallation due to disassembling for several times is avoided.

Further, as previously mentioned, the activation part 24 is the activation jack-prop. The linkage part comprises a piston device; when the activation part connects to the first vent port, the piston moves and enables the first channel.

Further on, the piston device comprises a piston and an elastic device. The piston and elastic device are arranged respectively in the movement of the main part. The elastic device is provided at the rear end of the piston and connects with the piston. Cock body of the piston is at least provided with: a first convex body, a flat body and a second convex body. Wherein a flat body space is formed between the flat body and the movement, which is interconnected with the vent part of the compression part, when the piston is in the state of uncompression, the second convex body fits closely with a shell of the movement to form a seal, and the compressed air of the flat body space enters directly into the first vent port, enabling the second channel;

when the piston is in the state of compression, the first convex body fits closely with the shell of the movement to form a seal, enabling the first channel, and compressed air of the flat body space enters the tire sealant apparatus through the second vent port, so as to pump the tire sealant out to the fluid port.

Embodiment 4

Figure 14:
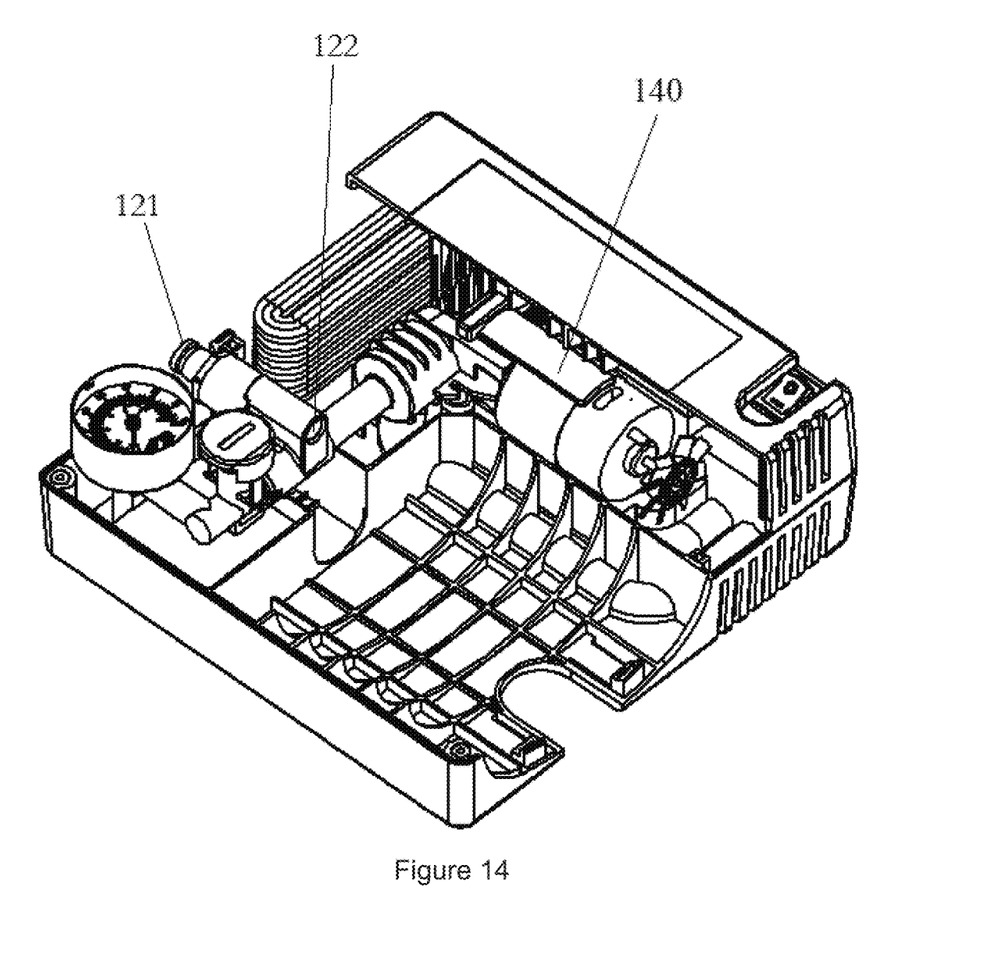
FIG. 14 shows a diagram of a compression part of the present invention.

For another aspect, the present invention provides a compression part. As shown in FIG. 14, a compression part 140, used for the foregoing device, comprises: a first vent port 121 and a second vent port 122; wherein an linkage apparatus of the device is provided in the first vent port 121 or the location connected with the first vent port 121; when the device infuses fluid to the tire, the second vent port 122 connects to the inlet of the tire sealant apparatus, and the linkage part is compressed and the first channel is enabled, then the compressed air is pressed into the tire sealant apparatus via the second vent port 122 and the tire sealant is pumped out; when the device inflates air to the tire, the compressed air is pressed into the tire via the first vent port 121.

Furthermore, combining the above embodiments, the first vent port 121 mentioned in this embodiment is the vent port 14 in the above embodiments; the second vent port 122 is located at the interior of the compression part 140. As known by combining other embodiments, the second vent port 122 connects to the inlet of the tire sealant apparatus 11. When the device enables the first channel, the compressed air enters the tire sealant apparatus 11 via the second vent port 122 and the inlet of the tire sealant apparatus 11, and the tire sealant is pumped out and enters the tire via the outlet of the tire sealant apparatus and the fluid port.

The above embodiments are only some embodiments disclosed in the invention. However, the invention is not limited hereto. The first channel and the second channel can be designed in various forms, instead of only limited to the forms disclosed by the figures of the specification. In addition, the linkage part in the embodiment is a piston, or other structures which can realize on/off operation. And, the linkage part can also be provided at the fluid port. These can be realized by means of mechanical conversion.

Preferred embodiments of the invention are only for illustrating the invention. They have neither stated all the details specifically, nor restricting the invention to be only the stated specific embodiments. Evidently, the embodiments can be modified and changed a lot as per the contents of the invention. The invention has selected and given specific description to these embodiments, so as to interpret the principle and practical application in a better way, thus enabling technicians of the technical field to utilize the invention better. The invention is only restricted by the claims as well as all of its coverage and equivalents.

What is claimed is:

1. A device for pressing air and/or tire sealant into a tire, comprising:
   a movement comprising a shell having a through-hole part and a pocket part, the through-hole part and the pocket part spaced from each other in a parallel relation;
   a main part comprising:
      a tire sealant apparatus filled with tire sealant;
      a compression part for pumping compressed air;
      a vent port;
      a fluid port coupled to the tire sealant apparatus; and
      a linkage part coupled to the vent port and the fluid port, the linkage part comprising a piston comprising: an elastic device connected to a rear end of the piston; a cock body having a first convex body, a flat body and a second convex body; the movement connecting the vent port to the compression part and a flat body space formed between the flat body and the movement; the piston being movable between a state of uncompression state and a state of compression, wherein operation of the linkage part connects the compressed air from the compression part either to a first channel coupled to the tire sealant apparatus, such that the compressed air forces the tire sealant to the fluid port; or to a second channel coupling the compressed air from the compression part to the vent port; and
      wherein when the piston is in the state of uncompression, the second convex body fits closely within the pocket part of the shell of the movement to form a seal, and the compressed air from the compression part passes through the flat body space into the vent port, enabling the second channel; and
      wherein when the piston is in the state of compression, the first convex body fits closely within the through-hole part of the shell of the movement to form a seal, and the compressed air from the compression part passes through the flat body space into the tire sealant apparatus, enabling the first channel; and
   a socket part comprising:
      an inlet pipe, for pressing the compressed air or tire sealant into a tire; and
      a socket component, having a first end connected to the inlet pipe, and a second end connected to the vent port and/or the fluid port;
      a first jack provided with a connecting device which connects with the vent port or the fluid port;
      a second jack connected to the vent port or the fluid port, and
      an active device located inside a space defined by the second jack, the active device operable to displace the piston so as, to couple the compressed air from the compression part to the first channel or the second channel, wherein:
         when the active device is in an air inflating mode the first jack connects with the vent port and the second jack connects to the fluid port, such that the linkage part couples the compressed air from the compression part to the second channel;
         when the active device is in a tire sealant infusion mode the first jack connects with the fluid port and the second jack connects to the vent port, such that the linkage part couples the compressed air from the compression part to the first channel; and
      wherein connecting the socket component to the vent port and/or the fluid port operates the linkage part to couple the compressed air from the compression part to the first channel or the second channel.

2. The device of claim 1 further comprising an activation part insertable into the vent port, such that when the activation part is inserted into the vent port, the linkage part is operated to couple the compressed air from the compression part to the first channel, and the device infuses tire sealant into the tire through the inlet pipe; and
   when the socket component is inserted into the vent port, the linkage part is operated to couple the compressed air from the compression part to the second channel and the device pumps air to the tire through the inlet pipe.

3. The device of claim 1, wherein, the active device is a jack-prop.

4. The device of claim 1, wherein, the seal formed by the first convex body in the shell comprises at least one O-ring.

5. The device of claim 1, wherein, the seal formed by the second convex body in the shell comprises at least one O-ring.

6. A device for pressing air and/or tire sealant into a tire comprising:
   a main part comprising:
      a tire sealant apparatus filled with tire sealant having an outlet;
      a compression part for pumping compressed air;
      a vent port;
      a fluid port coupled to outlet of the tire sealant apparatus; and
      a linkage part coupled to the vent port, wherein the linkage part comprises a piston comprising: an elastic device connected to a rear end of the piston, a cock body having a first convex body, a flat body and a second convex body; the compressed air from the compression part either to a first channel coupled to the tire sealant apparatus, such that the compressed air forces the tire sealant to the fluid port; or to a second channel coupling the compressed air from the compression part to the vent port; and
   a socket part comprising:
      an inlet pipe, for pressing the compressed air or tire sealant into the tire;
      a socket component;
      a throat pipe for introducing tire sealant into a tire, having an end connected to the outlet of the tire sealant apparatus or to the fluid port; and
      an activation part connectable with the vent port, such that when the activation part is connected to the vent port, the linkage part is operated to couple the compressed air from the compression part to the first channel and thus into the tire sealant apparatus, forcing the tire sealant into the throat pipe, pressing tire sealant into the tire; and
   a movement comprising a shell having a through-hole part and a pocket part, the through-hole part and the pocket part spaced from each other in a parallel relation, the movement connecting the vent port to the compression part and a flat body space formed between the flat body and the movement; the piston being movable between a state of uncompression state and a state of compression;
   such that when the piston is in the state of uncompression, the second convex body fits closely within the pocket part of the shell of the movement to form a seal, and the compressed air from the compression part passes through the flat body space into the vent port, enabling the second channel; and when the piston is in the state of compression, the first convex body fits closely within the through-hole part of the shell of the movement to form a seal, and the compressed air from the compression part passes through the flat body space into the tire sealant apparatus, enabling the first channel;

wherein the piston is coupled to the activation part, such that when the activation part is connected to the vent port, the activation part configured to movably displace the piston so as to operate the linkage part to couple the compressed air from the compression part to the first channel;

when the activation part is not connected to the vent port, an end of the inlet pipe is connected to the vent port; and the linkage part is operated to couple the compressed air from the compression part to the second channel coupled to the vent port, pumping air into the tire through the inlet pipe.

7. The device of claim 6, wherein the activation part is a jack-prop.

8. A compression part, used for the device of claim 1, comprises a first vent port and a second vent port; the device further comprises a linkage apparatus;

when the device infuses tire sealant to the tire, the second vent port connects to the inlet of the tire sealant apparatus, and the linkage part is compressed and enables the first channel, thus the compressed air is pressed into the tire sealant apparatus via the second vent port, and the tire sealant is pumped out;

when the device inflates air to the tire, the compressed air is pressed into the tire via the first vent port.

9. A compression part, used for the device of claim 6, comprises a first vent port and a second vent port; the device further comprises a linkage apparatus;

when the device infuses tire sealant to the tire, the second vent port connects to the inlet of the tire sealant apparatus, and the linkage part is compressed and enables the first channel, thus the compressed air is pressed into the tire sealant apparatus via the second vent port, and the tire sealant is pumped out;

when the device inflates air to the tire, the compressed air is pressed into the tire via the first vent port.

\* \* \* \* \*